United States Patent Office 3,090,761
Patented May 21, 1963

3,090,761
PROCESS FOR PREPARING A FOAMED SOLUTION OF POLYACRYLAMIDE EMPLOYING $CO_2$ AND PRODUCT PRODUCED THEREBY
Gerald R. Backlund, Maplewood, N.J., and Joseph F. Terenzi, Norwalk, Conn., assignors to American Cyanamid Company, New York, N.Y., a corporation of Maine
No Drawing. Filed June 24, 1959, Ser. No. 822,452
5 Claims. (Cl. 260—2.5)

The present invention relates to the preparation of high molecular weight polyacrylamide. More particularly, the invention is concerned with the improved processing and handling of extremely viscous aqueous solutions of polyacrylamide.

In making high molecular weight polyacrylamide, it is important, as a practical matter, that the solids content of the polymerizable material be as high as possible, i.e., it is economically more desirable to prepare a 10% solution rather than a 5% solution of a given polymer. With very high molecular weight polyacrylamide, i.e., having a molecular weight in excess of about 12 million, for example, a 10% solution is so viscous that mobility or flow is negligible and transmission of the material in a conventional pump used for viscous liquids is practically impossible. The handling of polymers of this character in concentrations upwards of about 7% is indeed difficult. We have discovered, as will be more fully disclosed in greater detail hereinafter in the specification, a procedure for substantially increasing the mobility of such solutions.

In essence, the invention resides in the incorporation into the polymerizable solution, prior to polymerization, of an inert gas which has substantial solubility in water and which upon being heated decreases in solubility, thereby effecting a foaming action on the polymer solution. The result is an expansion of the solution and a distinct increase in the mobility or flow of the viscous material.

It is an object of the present invention to increase the mobility of viscous aqueous solution of high molecular weight polyacrylamide. It is a further object of the invention to provide an improved process for preparing by solution polymerization high molecular weight polyacrylamide in relatively high concentrations. Other objects and advantages will become apparent as the description of the invention proceeds and specific embodiments thereof when taken with the appended claims.

The critical features of the present invention comprise an interdependent combination of conditions. The condition which imparts the increased flow to the polymer solution is believed to reside in the expansion and release of soluble gas from the polymer solution producing in effect a foaming action.

Because of the extreme viscosity of the polymeric solution, heat transfer is minimal. Therefore, external influence on the temperature of the solution is ineffective. Because of the poor heat transfer from the viscous polymer solution, the polymerization is carried out adiabatically, the exothermic heat of polymerization thereby effecting the temperature increase which liberates the soluble gas from the solution and effects the expansion. The adiabatic nature of the procedure is important. The conditions which must be obtained in the present invention comprise:

(1) A highly viscous polymeric aqueous solution.

(2) A substantial solubility of an inert gas in the polymerizable solution at lower temperature with a significantly lower solubility of the gas as temperature increases.

(3) A temperature sufficiently low, i.e., about 0° C. to enable solvation of a maximum amount of the gas, i.e., carbon dioxide, in the solution.

(4) An adiabatic polymerization.

The polyacrylamides with which the present invention is concerned will be defined hereinafter by their intrinsic viscosities, which are regularly employed by polymer chemists as a measurement of molecular weight. As used in the present specification and claims the term "intrinsic viscosity" is a value, expressed in deciliters per gram of polymer, which is proportional to the effective hydrodynamic volume or size of the polymer in solution at zero concentration; i.e., at infinite dilution. See J. Polymer Science, vol. 5, pages 745–7 (1950). This value must be distinguished from ordinary viscosity as measured in centipoises, since the latter term expresses the relationship of the resistance to flow of the liquid being measured to that of water at 68.6° F.

The intrinsic viscosity of a polyacrylamide is determined from the rate of flow of its dilute solutions in solvents such as 0.1 normal aqueous sodium chloride or normal aqueous sodium nitrate at 30° C. and at several concentrations. The ratio of the viscosity of the solution of the polymer at any one concentration to the viscosity of the solvent, as measured at 30° C., is the relative viscosity ($N_r$) at this concentration. This value minus one is equal to the specific viscosity ($N_{sp}$). The intrinsic viscosity is determined by plotting the ratio of the specific viscosity to the concentration of polymer against the concentration of the polymer and extrapolating the resultant plot to zero concentration. Ordinary viscosities are of course measured directly in standard instruments such as the Brookfield viscometer in which a spindle is rotated at a definite speed in the polymer solution and the resistance to motion is measured and converted to a viscosity value in centipoises.

Molecular weight studies based on light scattering and other indicia have shown that the weight average molecular weight of a polyacrylamide is expressed accurately by the formula Intrinsic viscosity in deciliters per gram
$$= 3.73\ M^{0.66} \times 10^{-4}$$

wherein M is the weight average molecular weight.

The inert gas employed in practicing the invention is carbon dioxide. Inasmuch as the polymerization reaction is preferably initiated at about 0° C., solid $CO_2$ (Dry Ice) may be employed not only to saturate the solution but to reduce the solution to the desired starting temperature. As a practical consideration, however, a more economical indirect heat exchange system for cooling the polymerizable solution such as brine, may be utilized prior to saturation of the polymer solution by using either solid, liquid or gaseous carbon dioxide.

We have discovered that carbon dioxide is effective in producing the desired result and that other non-toxic inert gases such as nitrogen (see Table I hereafter) which are commonly utilized as being inert to polymerization reactions, are ineffective. The increased mobility of the viscous solution is believed due to the foaming effect produced by the release of gas dissolved in the polymer. Nitrogen is unsuitable because of its relatively low solubility. From the following table which shows the relative solubility in water of carbon dioxide and nitrogen at atmospheric pressure (760 mm. Hg) it may be seen that the carbon dioxide released from a saturated solution thereof in water is more than 160 times the nitrogen released from a saturated aqueous solution between the temperatures of 0° C. and 30° C., temperatures which are most advantageous to the instant polymerization process.[1]

[1] The increase in temperature of the adiabatic polymerization reaction of acrylamide initiated at 0° C. until substantially complete polymerization of the monomer, is about 30° C. at a 10% concentration of acrylamide.

Table I
SOLUBILITY OF $CO_2$ V. $N_2$*

| Temperature | gm./100 gm. water | |
|---|---|---|
| | $CO_2$ | $N_2$ |
| 0° C | 0.335 | 0.0029 |
| 10° C | 0.232 | 0.0023 |
| 20° C | 0.169 | 0.0019 |
| 30° C | 0.120 | 0.0016 |

*See Lange's Handbook of Chemistry (8th edition), pages 1082-1083.

The polyacrylamides with which the polymerization process of the invention are concerned have intrinsic viscosities of at least 12 and preferably 18 and greater, and are prepared by polymerizing aqueous monomeric acrylamide solutions in the presence of free radical peroxygen catalysts, preferably redox catalyst systems, particularly mixtures of water-soluble metal salts of bromates or chlorates such as an alkali metal bromate or chlorate, e.g., sodium, potassium or lithium bromate, with water-soluble reducing compounds, preferably metal sulfites such as sodium, potassium or lithium sulfites or bisulfites; or a system such as hydrogen peroxide, iron salt and reducing sugar, for example. Various other salts of these bromates and chlorates known to those skilled in the art may also be used. In general, the catalysts are employed in amounts varying from about 0.005% to about 0.5%, preferably from about 0.01% to about 0.1% based on the weight of monomer. By judicious use of these catalysts and conditions, it is possible to obtain polyacrylamides of any desired molecular weight within the ranges discussed above such, for example, as by controlling the polymerization temperature and the molar ratios of the two ingredients of the redox catalyst system.

As noted, the polyacrylamides of the invention having intrinsic viscosities of at least 12 deciliters per gram and preferably 18 are produced by initiating the reaction at temperatures below 10° C. and preferably at about 0° C. with a redox catalyst system. A suitable catalyst system, for example, is the sulfate-bromate system in amounts of from about 0.1 to 0.8 mol of the sulfite for each mol of the bromate. The intrinsic viscosity of the polymer decreases as the molar ratio of the sulfite to the bromate approaches 1:1, and also as the weight ratio of bromate to acrylamide monomer is increased. By controlling these ratios it is possible to produce a polyacrylamide having the desired intrinsic viscosity of 12 deciliters per gram or greater. Further details including the results obtained with particular catalyst ratios and polymerization temperatures are described in the examples hereinbelow.

When prepared according to the hereindescribed procedure, the extremely viscous polyacrylamide may be suitably pumped and successfully separated from its aqueous solvent as by the procedure described in the pending U.S. patent application, Serial No. 737,759, filed on May 26, 1958, now abandoned. By that procedure the polymer is precipitated by the extrusion thereof into a moving stream of nonsolvent, such as methanol, the effect of the moving stream being such as to shear the extruded filaments into worm-like segments. The extruded particles are then separated from the methanol and readily dried.

The following examples describe methods for the preparation of representative polyacrylamides of the invention and illustrate the increased mobility of the polymer solutions. It will be understood, however, that these examples are given primarily for illustrative purposes and that the invention in its broader aspects is not limited thereto.

EXAMPLE 1

A 10% acrylamide aqueous solution comprising the following ingredients is polymerized in a suitable polymerization reaction vessel:

| | Parts |
|---|---|
| Acrylamide, recrystallized from acetone | 150 |
| Deionized water | 1350 |
| Sodium bromate, 0.5% solution | 6.0 |
| Sodium sulfite, 0.5% solution | 1.5 |
| Sulfuric acid, 1 N | 0.3 |

The deionized water was boiled for a 10-minute period and then air cooled to about room temperature while bubbling prepurified nitrogen through the water. The proper amount of boiled water, acrylamide, and sulfuric acid (to give a pH of 4.0) were added to the reaction vessel in a bath of ice water. The acrylamide dissolved while the solution was being cooled to 0° C. Prepurified nitrogen was bubbled through and saturated the solution during cooling and while the solution is at 0° C. The catalyst solutions were then added. Polymer was formed after one minute had elapsed. The nitrogen purge was stopped. The temperature rose to 6-7° C. in about an hour. The reaction condition was allowed to continue overnight to allow the polymerization to go to completion. The conversion to polymer is 98%. Negligible expansion occurred in the polymer solution relative to the volume of the monomer solution. The product is a tough gel which flowed very slowly in conforming to the shape of the container into which it is placed, i.e., the product is so viscous that it does not flow appreciably. A sample lump did not conform to the shape of the vessel into which it is placed even after ten hours.

EXAMPLE 2

The following formulation employing a carbon dioxide saturated monomer solution (9.8%) was processed in a suitable reaction vessel:

| | Parts |
|---|---|
| Acrylamide, recrystallized from acetone | 22.5 |
| Deionized water, boiled and $CO_2$ purged | 206 |
| Sodium bromate | 0.00225 |
| Sodium sulfite | 0.000565 |
| Sulfuric acid, 1 N | 0.0617 |

The deionized water was boiled for a 10-minute period and then cooled to about room temperature by circulating city water through the kettle jacket while adding small pieces of Dry Ice intermittently to keep oxygen out of the reactor. Then the acrylamide and sulfuric acid (to produce a pH of 4.0) were added and dissolved. Enough Dry Ice (about 40 parts) was gradually added to cool the solution to 0° C. The catalyst components (sodium bromate and sodium sulfite) were separately dissolved in about 0.44 part of water and added to the acrylamide solution. The formation of polymer was apparent 7 minutes later. Two hours later the temperature had reached 14° C. and expansion had started, as evidenced by the increased rise in the polymerizing material in the vessel. After reacting overnight (conversion=92%) the polymer solution foamed by the release of dissolved $CO_2$ in the exothermic polymerization reaction was successfully pumped and extrusion precipitated. A sample portion of volume approximately that of the sample used in Example 1 when placed in a container flowed relatively easily and conformed fully to the shape of the container in which it was placed within 15 minutes.

EXAMPLE 3

A 10% acrylamide aqueous solution comprising the following formulation:

| | Parts |
|---|---|
| Acrylamide, recrystallized from acetone | 30 |
| Deionized water, boiled and $CO_2$ purged | 269 |
| Sodium bromate | 0.006 |
| Sodium sulfite | 0.0015 |
| Sulfuric acid, 1 N | 0.097 | is polymerized in a suitable reaction vessel according to the following procedure: the deionized water was boiled for a 10-minute period and then cooled to about room temperature by circulating water from the main supply through the kettle jacket while adding small pieces of Dry Ice intermittently to keep oxygen out of the water. The acrylamide and sulfuric acid (to provide a pH of 4.0) were added and dissolved. Then, enough Dry Ice was gradually added to cool the solution to 3° C. (a total of about 50 parts Dry Ice required). The catalysts, sodium bromate and sodium sulfite, were each dissolved in about 0.44 part of water and added to the acrylamide solution. The batch started to thicken one minute later. After 3½ hours, the batch temperature reached about 30° C. and the batch had expanded to approximately 150% of its original volume. The conversion to polymer is 92%. A sample of the polymer solution readily (within 15 minutes) occupied the shape of a container into which it was placed. The polymer solution was successfully pumped and separated from its aqueous solvent by the extrusion precipitation procedure described in the earlier mentioned pending U.S. patent application, Serial No. 737,759, using methanol as the precipitating medium.

EXAMPLE 4

An acrylamide water solution (10.1% solids) comprising the formulation:

| | Parts |
|---|---|
| Acrylamide (94.5% pure) | 32 |
| Deionized water | 268 |
| Sodium bromate | 0.00302 |
| Sodium sulfite | 0.00075 |
| Dry Ice ($CO_2$) | 5.3 |
| Sulfuric acid, 1 N | 0.165 | is polymerized according to the following procedure: the acrylamide and sulfuric acid (to provide a pH of 3.8) were dissolved in the deionized water and the sodium bromate and the sodium sulfite were separately dissolved in 0.22 part of water each. The acrylamide solution was cooled to 1° C. by circulating 30° F. brine through the kettle jacket. 75% of the Dry Ice was added gradually during cooling of the solutions. The remainder was introduced when the solution reached near 0° C. The circulating brine was then shut off and the catalyst solutions added to the acrylamide solution. Before polymerization initiated the temperature had reached 8° C., however, after the polymerization had proceeded overnight, the batch increased to about 150% of its original volume. A sample of the expanded solution readily conforms (within 15 minutes) to the shape of a container into which it is placed. The molecular weight of the product is estimated at about 12-15 million as determined by comparative viscosity measurement with a polymer having a viscosity of 20 deciliters per gram.

EXAMPLE 5

Acrylamide dissolved in water (9.6% solids) comprising the formulation:

| | Parts |
|---|---|
| Acrylamide, 94.5% pure | 44 |
| Acrylic acid, inhibitor free | 1.83 |
| Deionized water, boiled and $CO_2$ purged | 388 |
| Sodium bromate | 0.00914 |
| Sodium sulfite | 0.0023 |
| Sulfuric acid, 1 N | 0.121 | is polymerized as follows:

In a suitable reaction vessel, the deionized water was boiled for a 10-minute period and then cooled to about room temperature by circulating water from the main supply through the kettle jacket while adding small pieces of dry ice intermittently to keep oxygen out of the water. The acrylamide, acrylic acid and sulfuric acid (which depresesd the pH to 2.5) were then dissolved in the water. Sufficient Dry Ice was then added gradually to cool the solution to 2° C. (about 75 parts Dry Ice required). The bromate and sulfite catalyst components which were separately dissolved in 0.44 part of water were added to the solution. The formation of polymer was apparent 3 minutes later. After the batch had reacted overnight (conversion about 93%) (volume increase to about 150% of original volume), the expanded polymer solution readily deformed to the shape of its contatner and was successfully pumped and extrusion precipitated into methanol as described in Example 3.

The invention has been described with reference to "polyacrylamides." Contemplated within the scope of this term are the polymers of acrylamido-type compounds such as those of the formula:

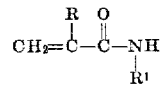

wherein R is a substituent selected from the group consisting of H or $CH_3$ and $R^1$ is a substituent of the group consisting of H, $CH_3$ or substituted methyl or ethyl groups containing the hydrophilic radicals OH, $NH_2$, COOH and

and copolymeric mixtures thereof.

Aqueous solutions of acrylamido-type polymers are extremely well-suited for various film-forming applications and largely due to their high viscosity even in dilute solutions, e.g. in solutions containing 1% and even less, they are excellent thickeners. Included among the acrylamido-type compounds of the general formula falling within the contemplation of the invention are the preferred compounds of acrylamide and methacrylamide, as well as N-methylacrylamide, N-hydroxymethylacrylamideamide, N-carboxymethylacrylamide, N-ureidomethylamide, N-aminoethylacrylamide, the methyl substituted derivatives thereof and the like, for example. The above compounds may be employed alone or in admixture with each other or copolymerized with minor amounts, e.g. less than 40% of other well-known polymerizable compounds containing the $CH_2=C<$ vinyl grouping.

Suitable comonomers which may be copolymerized with the acrylamido compounds in minor amounts, below about 40%, and in much lesser amounts with more hydrophobic copolymerizable compounds are for example, acrylic acid and salts thereof, such as, sodium acrylate, potassium acrylate, lithium acrylate, ammonium acrylate, and the like; polymers containing vinyl sulfonate units and salts thereof and the like; ring-substituted alkyl styrenes, such as, orthomethylstyrene, metamethylstyrene, para-methylstyrene, 2,4-dimethylstyrene, 2,5-dimethylstyrene, 3,4-dimethylstyrene, or the higher monoalkyl or polyalkyl ring-substituted styrenes including the ethyl, propyl, butyl and the like; the nitriles, such as, acrylonitrile, methacrylonitrile, ethacrylonitrile, alpha-chloroacrylonitrile and the like; the esters of acrylic acids, such as, methyl acrylate, ethyl acrylate, butyl acrylate, methyl methacrylate, ethyl methacrylate and the like. Still further, one could make use of the ring-substituted halostyrenes, such as, ortho, meta or para-chlorostyrene, 2,4-dichlorostyrene, 2,5-dichlorostyrene and the like. In the use of these latter monomers, namely, the styrenes, the nitriles, the acrylates and the like, to form copolymers with the acrylamides, acrylic acids and salts thereof and the like, amounts so as not to produce water-insoluble copolymers should be employed. If the polymer produced is water-insoluble, the present invention is not applicable thereto.

We claim:

1. A process comprising saturating an aqueous monomeric acrylamide solution, containing from about 7% to about 12% of said monomer, with carbon dioxide gas, introducing, into said gas-saturated solution a free radical polymerization catalyst and adiabatically polymerizing said acrylamide at a temperature below about 20° C. while continuing to maintain the solution in a carbon dioxide gas saturated state thereby producing a foamed polymeric solution of increased mobility having an intrinsic viscosity of at least 12 deciliters per gram.

2. A process comprising saturating an aqueous monomeric acrylamide solution, containing from about 8% to 11% of said monomer, with carbon dioxide gas, introducing, into the gas-saturated solution, a free radical polymerization catalyst and adiabatically polymerizing said acrylamide at a temperature below about 20° C. while continuing to maintain the solution in a carbon dioxide gas-saturated state thereby producing a foamed polymeric solution of increased mobility having an intrinsic viscosity of at least 12 deciliters per gram.

3. A process comprising saturating an aqueous monomeric acrylamide solution, containing from about 7% to 12% of said monomer, with carbon dioxide gas, introducing, into the gas-saturated solution, a free radical polymerization catalyst and adiabatically polymerizing said acrylamide at a temperature below about 20° C. while continuing to maintain the solution in a carbon dioxide gas-saturated state thereby producing a foamed polymeric solution of increased mobility having an intrinsic viscosity of at least 12 deciliters per gram wherein said catalyst is a mixture comprising a water-soluble bromate and a water-soluble sulfite containing from about 0.1 to about 0.8 mole of the sulfite for each mole of the bromate.

4. A process comprising saturating an aqueous monomeric acrylamide solution, containing from about 7% to about 12% of said monomer, with carbon dioxide gas, introducing, into the gas-saturated solution, a free radical polymerization catalyst and adiabatically polymerizing said acrylamide at a temperature below about 20° C. while continuing to maintain the solution in a carbon dioxide gas-saturated state thereby producing a foamed polymeric solution of increased mobility having an intrinsic viscosity of at least 12 deciliters per gram wherein said catalyst is a mixture comprising sodium bromate and sodium sulfite containing from about 0.2 to 0.5 mole of the sulfite for each mole of the bromate.

5. A foamed aqueous polyacrylamide solution of increased mobility containing from 7% to 12% by weight of polymerized acrylamide in solution, wherein said polyacrylamide has an intrinsic viscosity of at least 12 deciliters per gram and wherein said solution having been foamed with carbon dioxide during the polymerization of the acrylamide.

References Cited in the file of this patent

UNITED STATES PATENTS

| | | |
|---|---|---|
| 2,486,191 | Minsk et al. | Oct. 25, 1949 |
| 2,878,237 | Russell et al. | Mar. 17, 1959 |
| 2,922,768 | Mino et al. | Jan. 26, 1960 |
| 2,983,717 | Henley et al. | May 9, 1961 |

UNITED STATES PATENT OFFICE
CERTIFICATE OF CORRECTION

Patent No. 3,090,761                                        May 21, 1963

Gerald R. Backlund et al.

It is hereby certified that error appears in the above numbered patent requiring correction and that the said Letters Patent should read as corrected below.

Column 6, line 7, for "contatner" read -- container --; line 35, for "amideamide" read -- amide --.

Signed and sealed this 28th day of January 1964.

(SEAL)
Attest:

ERNEST W. SWIDER
Attesting Officer

EDWIN L. REYNOLDS

Acting Commissioner of Patents